United States Patent [19]

Cole et al.

[11] Patent Number: 5,006,690

[45] Date of Patent: Apr. 9, 1991

[54] ELECTRIC TOASTERS

[75] Inventors: Graham M. Cole, Lymington; Percival J. Shave, both of Lymington, England

[73] Assignee: Dreamland Electrical Applicances plc, Southampton, England

[21] Appl. No.: 238,338

[22] PCT Filed: Jan. 12, 1988

[86] PCT No.: PCT/GB88/00018

§ 371 Date: Aug. 29, 1988

§ 102(e) Date: Aug. 29, 1988

[87] PCT Pub. No.: WO88/05279

PCT Pub. Date: Jul. 28, 1988

[30] Foreign Application Priority Data

Jan. 15, 1987 [GB] United Kingdom ........... 8700878
Jan. 11, 1988 [EP] European Pat. Off. ......... 88300187

[51] Int. Cl.$^5$ ............................................. H05B 1/02
[52] U.S. Cl. .................................... 219/385; 99/328; 219/492; 219/521
[58] Field of Search ............... 219/385, 386, 543, 544, 219/492, 493, 521; 99/351, 388, 389, 390, 328, 333

[56] References Cited

U.S. PATENT DOCUMENTS

| 2,214,872 | 9/1940 | Barnes. | |
|---|---|---|---|
| 2,285,156 | 6/1942 | Gomersall. | |
| 2,711,684 | 6/1955 | Taylor | 99/389 |
| 3,146,692 | 9/1964 | Connolly | 99/379 |
| 3,524,404 | 8/1970 | Kimura | 219/544 |
| 3,641,921 | 2/1972 | Toyooka | 219/521 |
| 3,694,623 | 9/1972 | Toyooka | 219/200 |
| 3,737,624 | 6/1973 | Ellenberger | 219/525 |
| 3,746,837 | 7/1973 | Frey | 219/521 |

FOREIGN PATENT DOCUMENTS 0187492 7/1986 European Pat. Off. .
2417505 2/1975 Fed. Rep. of Germany .
8608121 6/1986 Fed. Rep. of Germany .

Primary Examiner—Teresa J. Walberg
Attorney, Agent, or Firm—Mason, Fenwick & Lawrence

[57] ABSTRACT

An electric toaster includes a pair of electrically heatable plates (16) which have toasting surfaces (18) that can be brought into contact with opposed surfaces of a slice of bread (14) or other item to be toasted. The temperatures of the toasting surfaces (18) can be adjusted, for example over a range substantially equal to 230° C. to 300° C., to enable the degree of browning of the bread to be controlled.

18 Claims, 2 Drawing Sheets

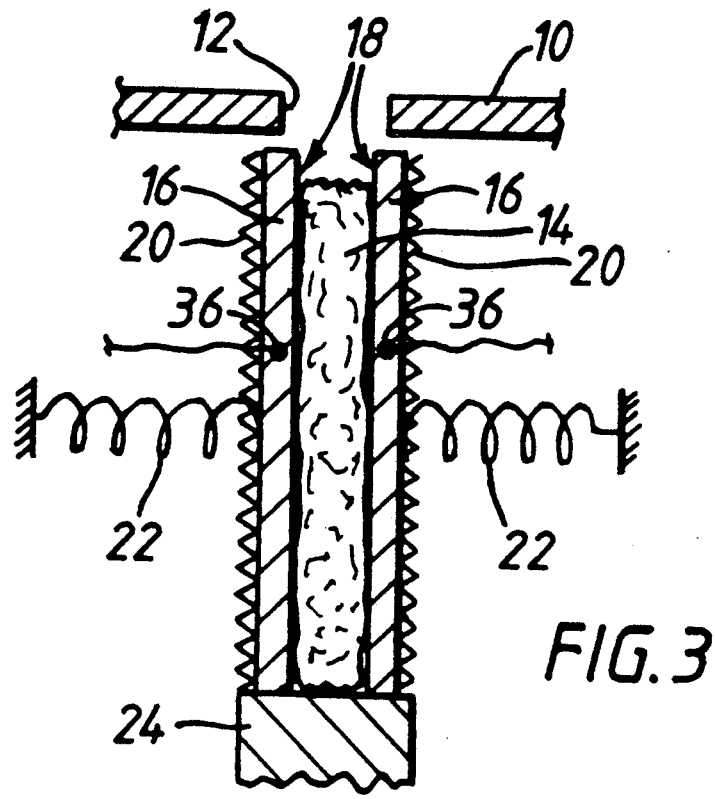
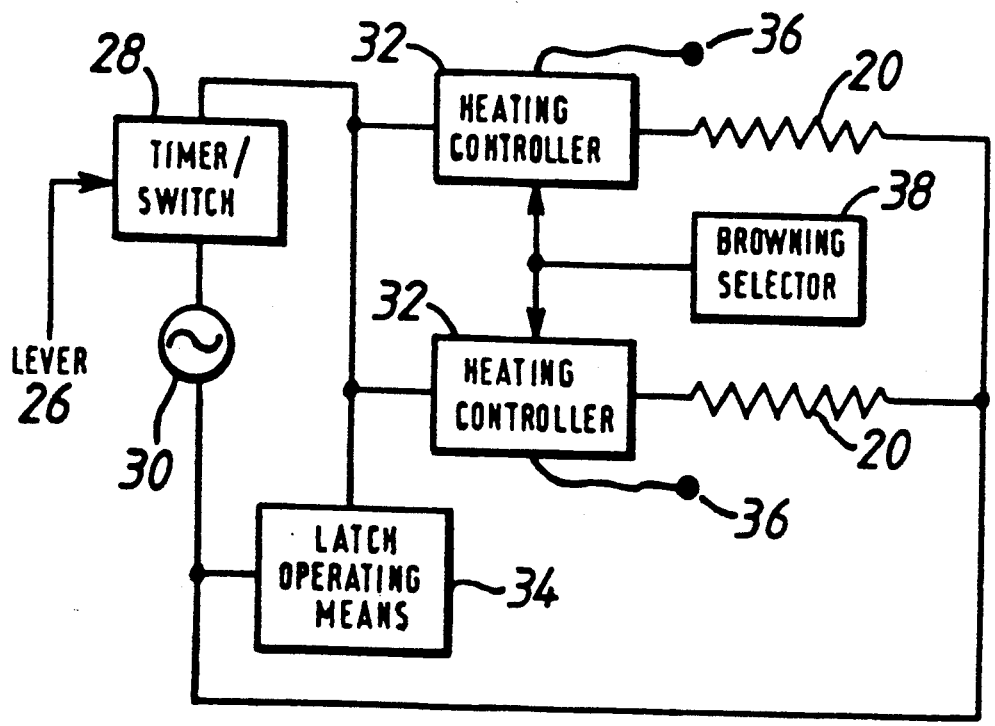

ELECTRIC TOASTERS

This invention relates to electric toasters, that is devices for toasting slices of bread or other toastable items of food.

Conventional electric toasters operate by heating a slice of bread or other item of food by means of one or more radiant (red hot) heating elements located close to (but spaced from) the bread or other item. Usually, the item to be toasted is positioned, with the aid of one or more grids or grilles, midway between two radiant heating elements. The degree of browning (toasting) of the item to be toasted depends upon the period of time during which the item is heated by the heating element(s). The period of time is manually adjustable to enable adjustment of the degree of browning. As is well known, the control of the degree of browning produced in this way is rather crude. Thus, the degree of browning produced for a given period of time will vary in dependence on various factors, such as:

(i) The type of bread or other item to be toasted (e.g. white, brown or granary bread).
(ii) The texture of the surface or other item to be toasted, i.e. smooth, porous or lumpy.
(iii) The moisture content of the bread or other item to be toasted, which will differ as between cases in which it is stale or fresh, pre-sliced or freshly sliced, and frozen or at room temperature.
(iv) The thickness of the bread or other item to be toasted, which controls the spacing between the heating elements and the surface(s) to be toasted.
(v) The ambient temperature, that is the temperature within the toaster at the start of the toasting period.

Thus user of the toaster may, by trial and error, adjust the toasting time in an attempt to produce an optimum setting at least for a particular supply of items to be toasted (for example slices of bread from a particular pre-sliced loaf) on a particular occasion. This enables a crude form of compensation for factors (i) to (iii) above.

With regard to factor (iv) above, some toasters employ sophiscated self-centering mechanisms which hold a slice of bread centrally between two heating elements. This should ensure approximately even browning of the two toasted surfaces, though it will be appreciated that, for a given period of time, the degree of browning of the two surfaces will increase as the thickness of the bread is increased (and the spacing from the elements is therefore reduced).

Factor (v) above, which results in an inability to produce a batch of toast of consistent quality, using a supply of identical slices of bread, without constant adjustment of the toasting period during toasting of the batch, is a frequent source of complaint from toaster users. To compensate at least partly for this disadvantage, conventional toasters may be fitted with an ambient temperature compensation device which reduces the toasting period as the average temperature within the toaster increases with repeated use.

In summary, conventional toasters aim to enable the user to produce toast of a certain colour by attempting to provide a crude correlation between the toasting time, sometimes with ambient temperature compensation, and the degree of browning produced. It is left to the user to ascertain, by trial and error, which setting or settings of the toasting period is needed for a particular type of bread (or other item) to be toasted.

As well as the disadvantage mentioned above, conventional radiant toasters are subject to mechanical factors which can affect the quality of the toast. For example, a non-uniform heating element can produce non-uniform toasting, and poor design of the grids or grilles can produce "striping" of the toast, that is linear regions of a reduced degree of browning. Further, high internal temperatures associated with the use of radiant heating elements can lead to design problems.

European Patent Application Publication No. EP-A-0 187 492 discloses a toaster comprising a pair of electrically heatable plates which have toasting surfaces that are brought into contact with opposed surfaces of a slice of bread or other item to be toasted. Naturally, since the plates are brought into contact with the bread or other item, they are heated to a temperature (as little as 250° C.) which is rather less than the temperature of the radiant (red hot) heating elements used in conventional toasters. According to EP-A-0 187 492, control of the degree of browning is achieved, as in conventional toasters, by adjusting the period or duration of heating.

According to the present invention there is provided an electric toaster comprising a pair of electrically heatable plates which have toasting surfaces than can be brought into contact with opposed surfaces of an item to be toasted, and means enabling adjustment of the temperatures of the toasting surfaces.

Suprisingly, in view of experience obtained with conventional toasters and in view of the teaching of EP-A-0 187 492, we have found that, in a toaster in accordance with the invention, control of the degree of browning is not in fact readily achievable by adjusting the toasting (heating) period. Instead, measurements carried out on white and brown bread have demonstrated that it is in fact the temperature of the toasting surfaces that is the dominant variable affecting the colour (degree of browning) of the toast. We have found that a toasting surface temperature of about 230° C. will produce a very light brown toast, and that increasing this temperature to about 300° C. produces very well toasted (very dark brown) toast. Thus, in a toaster in accordance with the invention, the degree of browning is controlled by adjustment of the temperatures of the toasting surfaces.

Preferably, the temperatures of the toasting surfaces are adjustable over a range substantially equal to 230° C. to 300 ° C.

We have found, surprisingly, that varying the toasting time or period has little or no effect on the degree of browning, but, rather, serves substantially only to increase the level of penetration of the toasting into the bread or other item. Typically, a toasting time or period of about 1.5 minutes will toast only the surfaces of a slice of bread, leaving the bread with a moist centre. Increasing the toasting time up to a maximum of about 6 minutes merely increases the depth of penetration of toasting until, at the maximum value of 6 minutes, the bread is virtually crisp right through. In practice, a toasting time of about 3 minutes gives toast of an excellent and consistent quality, regardless of the type and colour of bread that is employed and regardless of whether the bread is or is not frozen.

Preferably, at least one of the plates is resiliently urged towards the other, for example by one or more springs. This enables the plates to make proper contact with opposed surfaces of slices of bread of respective different thicknesses. Further the plates are preferably so mounted that at least one of them can pivot with respect to the other about at least one axis so that the plates can make proper contact with a wedge-shaped (tapered) slice of bread.

The invention will now be further described, by way of illustrative and non-limiting example, with reference to the accompanying drawings, in which:

FIG. 3 is a view corresponding to FIG. 2, but showing the toaster in a condition in which a slice of bread has been inserted therein and is being toasted; and FIG. 4 is a schematic electrical circuit diagram of the toaster.

Figure 1:
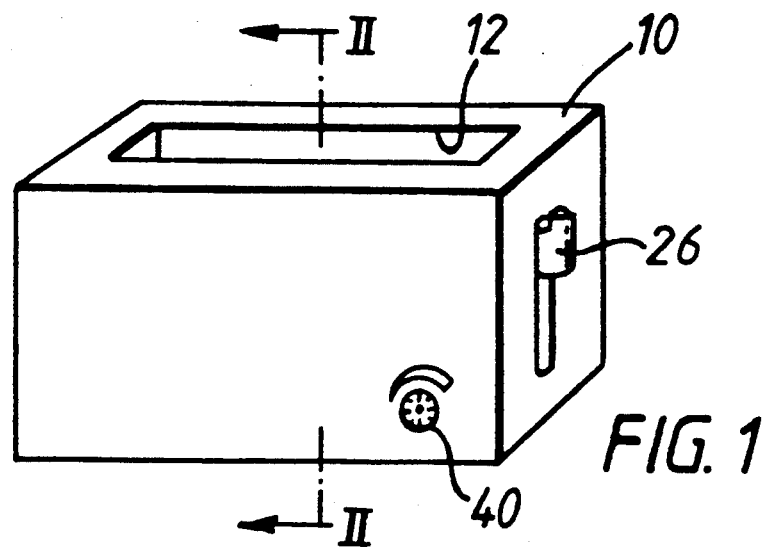
FIG. 1 is a perspective view of an electric toaster embodying the invention.

The drawings show an electric toaster that comprises a casing 10 having therein a slot 12 through which a slice of bread 14 (or other item of food, for example a crumpet or soft roll) may be inserted into the toaster.

A pair of contact plates 16 are mounted within the casing 10. The plates 16 have substantially flat toasting surfaces 18 that confront one another and which, as shown in FIG. 3, can be brought into contact with opposed surfaces of the slice of bread 14. For the sake of good heat transfer, the plates 16 are preferably of aluminium (being, for example, formed from aluminium plate or as aluminium die castings), though other materials (such as brass, copper or steel) could be used. The masses of the plates 16 should be kept as low as possible to ensure that, when they are heated as described below, warm-up takes place quickly. If necessary, to minimise the possibility of their becoming warped, the plates may be provided with ribs or seams. Typically, the plates 16 may each be 1 to 3 mm thick.

Preferably, the toasting surfaces 18 are smooth and capable of being wiped clean. Also, it has been found that superior results are obtainable if the toasting surfaces 18 have a black finish. To this end, the surfaces 18 may have a black polytetrafluoroethylene or black anodised finish.

The surfaces 18 may comprise surfaces of clip-on covers which can be detached from the plates 16 and removed for cleaning.

The plates 16 are provided with respective electrical heating means which may be of any form capable of heating the respective toasting surfaces 18 substantially uniformly. Conveniently, the respective electrical heating means takes the form of respective heating elements 20 (shown schematically as resistors) mounted on the back surfaces of the plates 16, namely the surfaces opposite to the toasting surfaces 18. In this case each heating element 20 may, for example, comprise: a flat ribbon-type resistive heating conductor wound over mica and "sandwiched" to the back surface of the respective plate 16 with a layer of mica in between; a tubular heating element clamped to the back surface of the respective plate 16; or a thick film heating element deposited on a suitable insulative medium and bonded to the back surface of the respective plate. In another alternative arrangement, each plate 16 may be of a ceramic or glass construction (rather than of aluminum or of some other metal) and its heating element 20 may be attached directly to its back surface: in this case the heating element 20 may be of a thick film printed/screen construction.

The contact plates 16 are resiliently biassed or urged towards one another by means shown as compression springs 22. This gives rise to two main advantages. Firstly, the toasting surfaces 18 of the plates 16 will engage properly with (and therefore toast properly) the oppoisite sides of slices of bread 14 of different thicknesses. Secondly, the slice of bread 14 will be held flat during toasting so that thin slices of bread will not, as in conventional toasters, become warped during the toasting process.

Preferably, the resilient mounting of the contact plates 16 is such as to enable the plates to pivot with respect to one another either universally (that is about any axis) or at least about a horizontal and/or vertical axis. In this way, the toasting surfaces 18 will engage properly with (and therefore toast properly) slices of bread 14 that are wedge-shaped or tapered, that is slices of bread of which the opposed surfaces to be toasted are not parallel to one another.

It should be appreciated that the above effects of accommodating properly both slices of bread 14 of different thicknesses and slices of bread that are tapered could be achieved also if one of the contact plates 16 is fixed in position and the other one is suitably resiliently biassed towards the fixed one.

Figure 2:
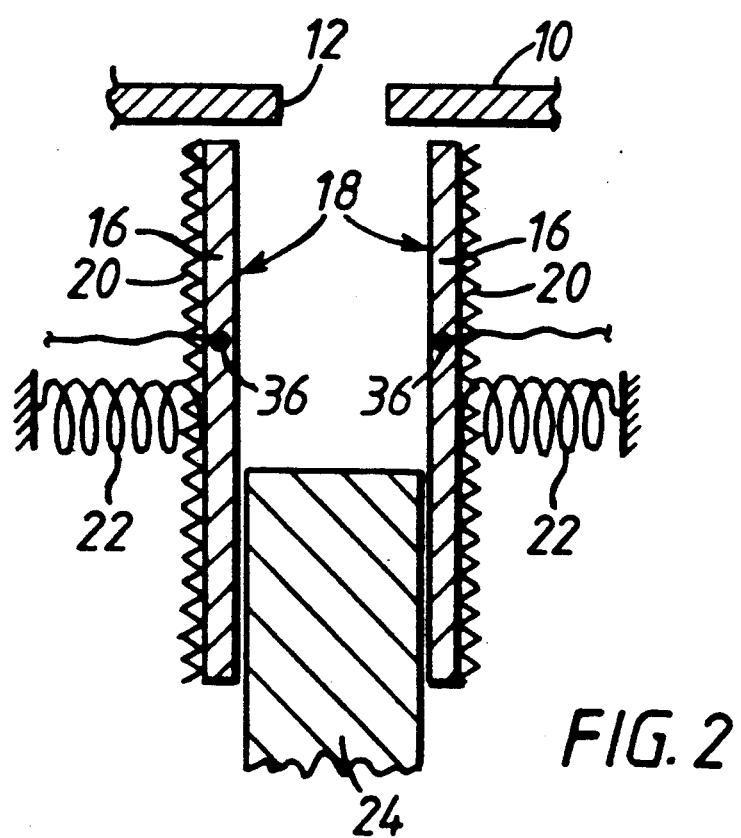
FIG. 2 is a somewhat cross-sectional view of the toaster taken along a line II—II in FIG. 1, showing the toaster in a condition ready to receive a slice of bread to be toasted.

FIG. 2 shows the toaster in a condition ready to receive a slice of bread to be toasted. To toast a slice of bread 14 the slice is inserted into the slot 12 and comes to rest on a support member 24 which is then positioned as shown in FIG. 2. The upper end of the slice then protrudes above the slot 12. To activate the toaster, a lever 26 (FIG. 1) emerging through a slot 28 in the side of the casing 10 is pushed downwardly from the position shown in FIG. 1 to a position at the bottom of the slot. The lever 26 is coupled to the support member 24 so that the support member (and the slice of bread 14) is moved downwardly to the position shown in FIG. 3. When this position is reached, a latch means (not shown) is actuated, mechanically or electrically, to latch the support member 24 in the position shown in FIG. 3, against the force of a spring (not shown) which biasses the support member towards the positon shown in FIG. 2, and to release the contact plates 16, which were latched in the positions shown in FIG. 2 against the forces of the springs 22 so that the plates 16 move towards one another and lightly engage the opposite sides of the slice of bread 14.

Movement of the lever 26 to the lower position also actuates a timer/switch 28 (FIG. 4) which connects the heating elements 20 to an electrical power supply 30, via respective heating controllers 32, for a predetermined period of time. If the above-mentioned latch means is atuated electrically, such actuation can be effected at this time via a latch operating means 34 which may be responsive directly to movement of the lever 26 to the lower portion or responsive to actuation of the timer/switch 28 caused by movement of the lever 26 to its lower position.

Each heating controller 32 is connected to a respective temperature sensor 36 which is operative to sense the temperature of a respective one of the toasting surfaces 18 of the contact plates 16. Both heating controllers 32 are connected to a browning selector 38 (FIG. 4) which is manually adjustable by means of a knob 40 (FIG. 1) to establish a set point signal representative of a desired temperature of the toasting surfaces 18. The set point signal can be adjusted over a range of temperatures from about 230° C. (very light brown toast) to about 300° C. (very dark brown toast). The heating controllers 32 are responsive to the set point signal from the browning selector 38 and to the actual temperatures determined by the temperature sensors 36 to control the flow of current into the heating elements 20 to keep both the toasting surfaces 18 at the temperature selected within the range of about 230° to 300° C. Ideally, any difference between the temperatures of the toasting surfaces 18 should be kept low.

This process of heating the plates 16 to a desired temperature continues during the above-mentioned predetermined period of time determined by the timer/switch 28. If control of the degree of browning only of the toast is desired, the predetermined period of time may be fixed at, for example, 3 minutes, which, as explained above, produces toast of excellent quality. However, if control of the cripness also of the toast is desired, the predetermined period of time may be manually adjustable (for example from 1.5 to 6 minutes) via a knob or other control member (not shown) provided on the casing 10.

At the end of the predetermined period of time, the flow of current to the heating elements 20 is disabled. Also, the latch operating means 34 is operative to return the plates 16 to their positions shown in FIG. 2, possibly under the influence of one or more springs (not shown), and to put the latch means back into its original state so that the plates 16 are latched in those positions and the support member 24 is unlatched so that it can move upwardly under the force of its spring (not shown) so that the toasted slice of bread "pops-up" out of the slot 12, that is it is ejected partially from the slot 12 for the convenience of the user.

The electrical circuit of the toaster, as shown somewhat schematically in FIG. 4, can be implemented in various ways. For example, the two heating controllers 32, the two temperature sensors 36 and the browning selector 38 might in practice be constituted by a close differential adjustable thermostat. Alternatively, the heating controllers 32 might be constituted by an electronic switch circuit arrangement connected to thermocouples or thermistors, acting as the temperature sensors 36, and to a potentiometer acting as the browning selector. Whatever arrangement is employed, if the desired degree of browning is reliably to be achieved it is important to ensure that the temperatures of the toasting surfaces 18 are not allowed to depart significantly during the toasting process from the temperature selected by means of the browning selector 38. That is, the differential between the temperatures between which the toasting surfaces 18 cycle as the heating elements 20 are switched on and off, in order to maintain the selected temperature, should be small, preferably no more than ±3° C. Typically, in a mechanical thermostat operative at a temperature in the range in question, the temperature differential might be ±20° C. This would be too large. If a mechanical thermostat is used, it should be a close differential thermostat having a differential of no more than ±3° C.

The timer/switch 28 may be of a mechanical, thermal or electronic construction.

The invention can, of course, be carried into effect in other ways than that described above by way of illustrative and non-limiting example. Some other ways in which the invention can be carried into effect will now be briefly outlined.

(i) As indicated above, only one of the contact plates 16 need be movable. In that case, in the above-described embodiment, not only would only one of the plates 16 require a resilient mounting means as represented by the spring 22, but only that one plate 16 would need to be moved on insertion and ejection of bread.

(ii) The above-described toaster has been designed so that, from the point of view of the user, it operates much like a vertical loading toaster having a side-mounted lever that is pushed down to start the toasting process, the toast "popping up" (being ejected) when toasting is complete. It should be appreciated, however, that any other loading mechanism and/or actuating mechanism can be employed and that an ejection of "pop-up" mechanism need not be provided. Toasters embodying the invention might, for example, be of a horizontal loading design intended to rest on a work-surface or be clamped beneath a work surface.

(iii) A toaster embodying the invention could be designed to toast two or more slices, for example by using a respective pair of resiliently mounted contact plates for each slice, or by using one fixed contact plate for engaging one surface of each of the slices and a respective single resiliently mounted contact plate for engaging the other surface of each slice.

(iv) If the heating plates 16 are physically of the same construction, it will suffice to monitor the temperature of one only of the plates. In this case, for example, one could connect the heating elements 20 in series and control them both by means of a single heating controller 32 connected to a single temperature sensor 36 operative to sense the temperature of one only of the toasting surfaces 18.

We claim:

1. An electric toaster comprising:
   a pair of electrically heatable plates which have toasting surfaces that can be brought into contact with opposed surfaces of an item to be toasted;
   selector means that is manually adjustable to select a desired set point temperature;
   temperature sensing means for sensing the temperature of at least one of said toasting surfaces;
   heating control means responsive to said selector means and said temperature sensing means to control electrical heating of said plates such that said toasting surfaces are heated to temperatures corresponding to said selected set point temperature; and
   timer means for causing said electrical heating of said plates to take place for a predetermined period of time, the duration of said predetermined period of time being manually adjustable independently of said manual adjustment of said set point temperature.

2. An electric toaster according to claim 1, wherein the temperatures of the toasting surfaces are adjustable over a range substantially equal to 230° C. to 300° C.

3. An electric toaster according to claim 1, wherein the temperature of each toasting surface can vary, in use, by no more than ±3° C. about a set value.

4. An electric toaster according to claim 3, wherein said selector means, said temperature sensing means and said heating control means are constituted by a close differential adjustable mechanical thermostat having a differential of no more than ±3° C.

5. An electric toaster according to claim 1, wherein at least one of the plates is resiliently urged towards the other.

6. An electric toaster according to claim 1, wherein the plates are so mounted that at least one of them can pivot with respect to the other about at least one axis.

7. An electric toaster according to claim 1, wherein the duration of the predetermined period of time is adjustable over a range substantially equal to 1.5 to 6 minutes.

8. An electric toaster according to claim 7, wherein the temperatures of the toasting surfaces are adjustable over a range substantially equal to 230° to 300° C.

9. An electric toaster according to claim 8, wherein the temperature of each toasting surface can vary, in use, by no more than ±3° C. about a set value.

10. An electric toaster according to claim 9, wherein said selector means, said temperature sensing means and said heating control means are constituted by a close differential adjustable mechanical thermostat having a differential of no more than ±3° C.

11. An electric toaster comprising:
a pair of electrically heatable plates which have toasting surfaces that can be brought into contact with opposed surfaces of an item to be toasted;
selector means that is manually adjustable to select a desired set point temperature within a range substantially equal to 230° C. to 300° C.;
temperature sensing means for sensing the temperature of at least one of said toasting surfaces;
heating control means responsive to said selector means and said temperature sensing means to control electrical heating of said plates such that said toasting surfaces are heated to temperatures corresponding to said selected set point temperature and such that the temperature of each toasting surface can vary by no more than ±3° C. about a set value; and
timer means for causing said electrical heating of said plates to take place for a predetermined period of time, the duration of said predetermined period of time being manually adjustable, over a range substantially equal to 1.5 to 6 minutes, independently of said manual adjustment of said set point temperature.

12. An electric toaster according to claim 11, wherein said selector means, said temperature sensing means and said heating control means are constituted by a close differential adjustable mechanical thermostat having a differential of no more than ±3° C.

13. A method of toasting a slice of bread or other item, the method comprising:
bringing toasting surfaces of a pair of plates into contact with opposed surfaces of said item;
manually selecting a desired set point temperature to select a degree of browning of the toasted time;
manually selecting a period of time, to select a degree of crispness of the toasted item, independently of said manual selection of said set point temperature;
electrically heating said plates for said selected period of time;
sensing the temperature of at least one of said toasting surfaces; and
controlling said electrical heating in responsive to said selected set point temperature and said sensed temperature such that said toasting surfaces are heated to temperatures corresponding to said selected set point temperature.

14. A method according to claim 13, wherein said manually selected set point temperature lies within a range substantially equal to 230° C. to 300° C.

15. A method according to claim 14, wherein said manually selected period of time lies within a range substantially equal to 1.5 to 6 minutes.

16. A method according to claim 13, wherein said manually selected period of time lies within a range substantially equal to 1.5 to 6 minutes.

17. A method according to claim 16, wherein the temperature of each toasting surface is controlled to vary by no more than ±3° C. about a set value.

18. A method according to claim 13, wherein the temperature of each toasting surface is controlled to vary by no more than ±3° C. about a set value.

* * * * *